United States Patent [19]

Burgess

[11] 3,724,707
[45] Apr. 3, 1973

[54] PRESSURE-VACUUM RELIEF FUEL FILLER CAP

[75] Inventor: Ronald R. Burgess, Flushing, Mich.

[73] Assignee: F & E Manufacturing Company, Flint, Mich.

[22] Filed: May 5, 1971

[21] Appl. No.: 140,422

[52] U.S. Cl. .................................220/44 R, 320/24 C
[51] Int. Cl. ...............................................B65d 51/16
[58] Field of Search..................220/44 R, 44 A, 24 C

[56] References Cited

UNITED STATES PATENTS 2,732,971   1/1956   Holmes et al.........................220/44 R
2,191,614   2/1940   Frantz..................................220/44 R
3,119,513   1/1964   Lata.....................................220/60 R
2,528,791   11/1950  Scoville............................220/44 R X
2,603,379   7/1952   Friend..................................220/44 R
3,111,239   11/1963  Ivins....................................220/44 R Primary Examiner—Robert S. Ward, Jr.
Attorney—Barnes, Kisselle, Raisch & Choate

[57] ABSTRACT

A pressure-vacuum relief fuel filler cap assembly comprising a cover, a locking cup fixed to said cover, and a valve assembly fixed on said locking cup. The valve assembly comprises interfitting upper and lower valve body members made of plastic. A pressure relief valve and associated seat and a vacuum relief valve and associated seat are provided within the valve assembly.

11 Claims, 4 Drawing Figures

PATENTED APR 3 1973 3,724,707

INVENTOR
RONALD R. BURGESS

BY Barnes, Kisselle,
Raisch & Choate
ATTORNEYS

PRESSURE-VACUUM RELIEF FUEL FILLER CAP

This invention relates to fuel filler caps.

BACKGROUND OF THE INVENTION

"Evaporative loss control" or evaporative emission control" are terms in general use to define a control, or method of controlling, hydrocarbons emissions to the atmosphere caused by evaporation of fuel. Included in this definition are those losses of evaporative nature from carburetor fuel bowl venting systems and from fuel tank venting systems.

When a hot engine is shut down, for instance, the residual heat in the engine can raise fuel bowl temperatures in some cases above 200°F. It is not unusual that under certain climatic, and geographic conditions that the fuel bowl will boil completely dry, emitting the associated evaporated hydrocarbons to the atmosphere.

Fuel tank evaporative losses can occur in much the same manner although the associated temperatures involved are somewhat reduced. If a fuel tank is filled with relatively cool fuel from underground storage tanks and then left to stand under high ambient temperature conditions, an actual loss of liquid fuel can occur, as well as evaporative loss. These losses occur through either vented fuel tanks or vented fuel filler caps; whichever are employed for the purpose of preventing fuel tank rupture and or pressure differentials which may affect fuel pump operation.

The losses so described have been estimated to be 10-15 percent of the total hydrocarbon discharge to the atmosphere associated with internal combustion engines. Some jurisdictions have legislated control of these losses.

There are in general two control systems being utilized by the industry. The first system is generally called a vapor-recovery system wherein the vapors are directed to the crankcase and utilizes a pressure vacuum relief fuel filler cap as a means of protecting the fuel tank from structural damage due to excessive pressure differentials caused during severe operation or by system malfunction. The system is considered to be fail safe as the fuel filler cap design eliminates the possibility of damage to the system which may be hazardous.

The second system is generally called an adsorption-generation system, and is similar to the first system except that a charcoal canister is utilized to entrap vapors for later burning. This system also utilizes a pressure vacuum relief fuel filler cap.

Among the objects of the invention are to provide a combined pressure vacuum relief fuel filler cap which is adapted to vent excess pressure as well as relieve vacuum in an evaporative loss system or an evaporative emission control system; which is easily constructed; and which will effectively operate within predetermined limits.

SUMMARY OF THE INVENTION

A pressure-vacuum relief fuel filler cap assembly comprising a cover, a locking cup fixed to said cover, and a valve assembly fixed on said locking cup. The valve assembly comprises interfitting upper and lower valve body members made of plastic. A pressure relief valve and associated seat and a vacuum relief valve and associated seat are provided within the valve assembly.

DESCRIPTION

Figure 1:
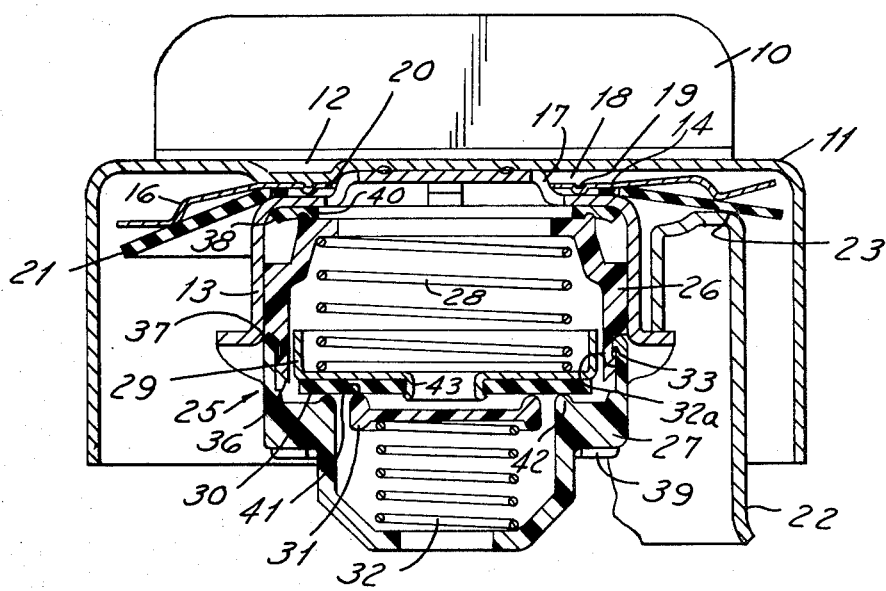
FIG. 1 is a vertical sectional view of the fuel filler cap embodying the invention with the right half of this section showing the position of the cap relative to the filler neck when assembled on the filler neck.

Referring to FIG. 1, a handle 10, and cover 11 are projection welded together. The handle 10 is oriented with the depressions 12 and any lettering on the cover 11 so that the wording will not be obscured by the handle 10.

A locking cup 13, gasket 14, gasket 21, and a spring metal diaphragm ring 16 are then assembled and the cover 11 and handle 10 is welded to the locking cup 13. The projection welds for attaching cover 10 to locking cup 13 are oriented in such a manner that the vent holes 17 in the locking cup 13 are always opposite the voids or spaces 18 in the cover 11 and are never blocked by depressions 12, since if the depressions 12 are not oriented properly with respect to the vent holes 17, a restricted airflow may occur through the venting system.

Gasket 14 is somewhat compressed during welding between the flat surface of the locking cup 13 and the diaphragm 16. A circular sealing ring 19 is formed in diaphragm 16 to provide a seal at this point. The diaphragm 16 also has an extruded, circular lip at 20 to prevent the possibility of material from gasket 14 from being extruded into vent holes 17 which would restrict air flow through vent holes 17.

A gasket 21 is designed to be able to rotate freely when in position. When the cap is assembled on filler neck 22 the gasket 21 is compressed at point 23 providing a seal at this point around the entire diameter of the filler neck 22.

A valve assembly 25 is made from an upper valve body 26 and a lower valve body 27, a pressure relief spring 28, a valve cap 29, a valve seat 30, a valve 31, and a vacuum relief spring 32. The valve bodies 26, 27, as well as the valve 31 are made of organic plastic such as nylon. The upper and lower valve bodies 26, 27 are constructed to allow the parts to be snapped together against the interior spring forces and to retain the parts in position during welding. Diameter 32a on body 26 and diameter 33 on body 27 are interference fits. Both parts have undercut cast diameters adjacent to diameters 32a and 33. A chamfer 36 at end of body 26 is added to provide some lead in during assembly. This construction allows the parts to be snapped together by simple manual or mechanical means. The interfering diameter and associated undercut diameters will not allow the valve body halves to be separated except by exterior physical force. When the above mentioned parts are held in the position shown the upper valve body 26 and lower valve body 27 are ultrasonically welded to form an air tight seal. Ultrasonic welding requires proper location of parts in a fixture but they must not be held in any manner which would adversely affect proper vibration of the parts which is essential to the operation. Once welded the parts exhibit an air tight bond around entire diameter at point 37.

Valve assembly 25 and a gasket 38 are then inserted in cup 13. The four elongated tabs 39 on the locking cup 13 are then crimped in place to retain the valve assembly 25 in the locking cup 13. This operation compresses gasket 38 between the interior flat surface of the locking cup 13 and the sealing bead 40 on the valve body 26, forming an air tight seal. The fuel filler cap assembly is now completed.

When the fuel filler cap is applied to the filler neck 22 air tight seals are effected at points 19 and 23. This insures that the only path of air flow from the interior of the fuel tank to the atmosphere or vice versa, is through the valve assembly 25 itself, and the associated passages in the cover portion of the fuel filler cap.

Valve 31 is held to the underside of a seat 30 at the diameter of valve at point 41 by spring 32. Spring 32 is weaker than spring 28 by such an amount that valve cap 29 and valve seat 30 are held in contact with the sealing diameter of body 27 at point 42. Valve seat 30 is crimped to valve cap 29 around its inside diameter at point 43. This crimping holds valve seat 30 to valve cap 29 in proper position during operation of valve assembly. This crimping operation, however, is very light such that it does not deform the undersurface of valve seat 30 which could cause a leak at point 41 or 42.

The sealing surfaces at point 41 and 42 are very critical to the design as there must be no leakage through the valve until the designed values of pressure differential between the fuel tank and the atmosphere are reached. These surfaces must be flat, smooth, and free of any surface irregularities. Because of aforementioned desire to weld the assembly air tight, and to provide a snap together method of assembly along with the surface conditions desired at points 41, 42 plastics are chosen for the material for manufacturing parts 26, 27 and 31. The surfaces of valve seat 30 (both sides) are also important to this design. They must be resilient and also flat and free of imperfections. The material selected is a low durometer rubber. Normally these types of parts are die cut from commercially available sheet stocks. Molded construction may also be used.

As has been explained before, when the cap is in place on filler neck 22, air tight seals are effected at points 42, 41, 40, 37, 23 and 19 assuring that no air will flow through the cap from the fuel tank to the atmosphere or vice versa except through the valve assembly 25 and only at those pressure differentials exceeding the limits for which the cap was designed.

Figures 2, 3:
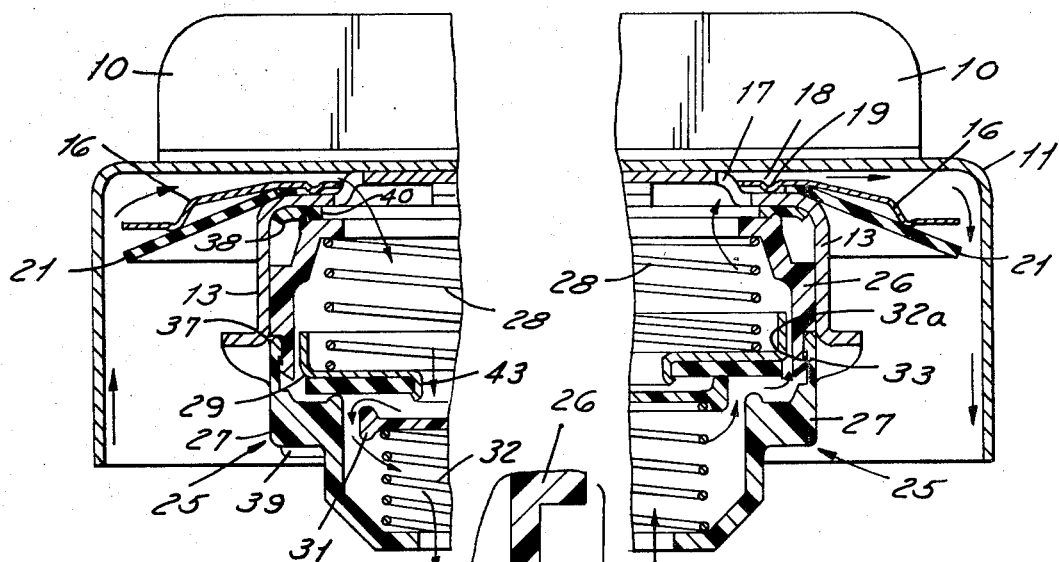
FIG. 2 is a part sectional view showing the left half of the fuel filler cap during vacuum relief.
FIG. 3 is a part sectional view of the right half of the fuel filler cap during pressure relief.
Figure 4:
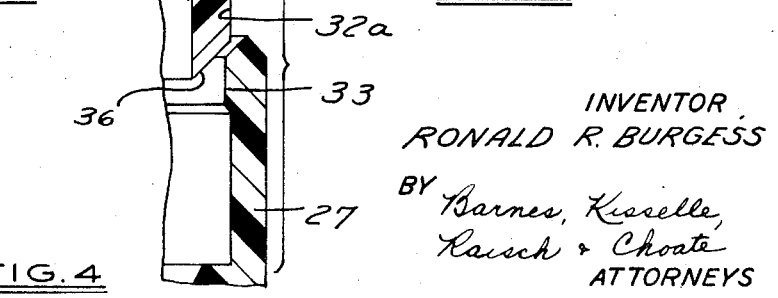
FIG. 4 is a fragmentary exploded sectional view of a portion of the fuel filler cap.

When a positive pressure differential builds up to a predetermined value in the tank, valve 31, seat 30, and cap 29 will move upward against the action of spring 28. The valves remain in this position until the pressure differential reduces to the point where the force in spring 28 returns the valves to the sealed condition. The relative position of the parts and the path of pressure relief through the cap are shown in FIG. 3.

When a negative pressure differential builds up in the tank, valve 31 will move downward against the action of spring 32. The valve 31 will remain in this position until the pressure differential is reduced to the point where the force in spring 32 can return the valve to its seated position. The relative position of the parts and the path of vacuum relief through the cap are shown in FIG. 2.

I claim:

1. A pressure vacuum relief fuel filler cap comprising
a cover,
a locking cup fixed to said cover generally centrally thereof,
a gasket and diaphragm ring interposed between said cover and said locking cup for providing a resilient force on a filler opening,
a valve assembly fixed in said locking cup,
said valve assembly comprising an upper valve body,
a lower valve body,
means frictionally interconnecting said lower valve body on said upper valve body,
a pressure relief valve and associated valve seat within said valve assembly,
and a vacuum relief valve and associated valve seat within said valve assembly,
said means interconnecting said valve bodies comprising interfitting telescoping portions,
said telescoping portions including interengaging peripheral beads which snap over one another,
each said bead having an undercut portion thereof,
a chamfer on one of said telescoping portions to facilitate assembly with the other of the peripheral walls.

2. A pressure vacuum relief fuel filler cap comprising
a cover,
a locking cup fixed to said cover generally centrally thereof,
a gasket and diaphragm ring interposed between said cover and said locking cup for providing a resilient force on a filler opening,
a valve assembly fixed in said locking cup,
said valve assembly comprising an upper valve body,
a lower valve body,
means frictionally interconnecting said lower valve body on said upper valve body,
a pressure relief valve and associated valve seat within said valve assembly,
and a vacuum relief valve and associated valve seat within said valve assembly,
said locking cup including portions thereof bent to retain said valve assemblies within said locking cup.

3. A pressure vacuum relief fuel filler cap comprising
a cover,
a locking cup fixed to said cover generally centrally thereof,
a gasket and diaphragm ring interposed between said cover and said locking cup for providing a resilient force on a filler opening,
a valve assembly fixed in said locking cup,
said valve assembly comprising an upper valve body,
a lower valve body,
means frictionally interconnecting said lower valve body on said upper valve body,
a pressure relief valve and associated valve seat within said valve assembly,
and a vacuum relief valve and associated valve seat within said valve assembly.
said pressure valve assembly comprising a pressure valve, spring means yieldingly urging said pressure valve in one direction,
said lower valve body including a valve seat,
said vacuum valve comprising a vacuum valve member,
a spring yieldingly urging said vacuum valve member against said pressure valve.

4. The combination set forth in claim 3 wherein said spring comprises a compression spring interposed between the valve body and the valve member.

5. A pressure vacuum relief fuel filler cap comprising a cover,
a locking cup fixed to said cover generally centrally thereof,
a gasket and diaphragm ring interposed between said cover and said locking cup for providing a resilient force on a filler opening,
a valve assembly fixed in said locking cup,
said valve assembly comprising an upper valve body,
a lower valve body,
means frictionally interconnecting said lower valve body on said upper valve body,
a pressure relief valve and associated valve seat within said valve assembly,
and a vacuum relief valve and associated valve seat within said valve assembly,
a diaphragm ring interposed between said cover and said cup,
a resilient seal between said locking cup and said diaphragm ring,
a bead on said diaphragm ring engaging said resilient seal.

6. For use in a pressure vacuum relief fuel filler cap comprising a cover, a locking cup fixed to said cover generally centrally thereof, a gasket and diaphragm ring interposed between said cover and said locking cup for providing a resilient force on a filler opening,
a valve assembly adapted to be fixed in said locking cup,
said valve assembly comprising an upper valve body,
a lower valve body,
means frictionally interconnecting said lower valve body on said upper valve body,
a pressure relief valve and associated valve seat within said valve assembly,
and a vacuum relief valve and associated valve seat within said valve assembly,
said means interconnecting said valve bodies comprising interfitting telescoping portions,
said telescoping portions including interengaging peripheral beads which snap over one another,
each said bead having an undercut portion thereof,
a chamfer on one of said telescoping portions to facilitate assembly with the other of the peripheral walls.

7. The combination set forth in claim 6 wherein said upper and lower valve bodies are made of plastic material.

8. For use in a pressure vacuum relief fuel filler cap comprising a cover, a locking cup fixed to said cover generally centrally thereof, a gasket and diaphragm ring interposed between said cover and said locking cup for providing a resilient force on a filler opening,
a valve assembly adapted to be fixed in said locking cup,
said valve assembly comprising an upper valve body,
a lower valve body,
means frictionally interconnecting said lower valve body on said upper valve body,
a pressure relief valve and associated valve seat within said valve assembly,
and a vacuum relief valve and associated valve seat within said valve assembly,
said locking cup including portions thereof bent to retain said valve assemblies within said locking cup.

9. For use in a pressure vacuum relief fuel filler cap comprising a cover, a locking cup fixed to said cover generally centrally thereof, a gasket and diaphragm ring interposed between said cover and said locking cup for providing a resilient force on a filler opening,
a valve assembly adapted to be fixed in said locking cup,
said valve assembly comprising an upper valve body,
a lower valve body,
means frictionally interconnecting said lower valve body on said upper valve body,
a pressure relief valve and associated valve seat within said valve assembly,
and a vacuum relief valve and associated valve seat within said valve assembly,
said pressure valve assembly comprising a pressure valve,
spring means yieldingly urging said pressure valve in one direction,
said lower valve body including a valve seat,
said vacuum valve comprising a vacuum valve member,
a spring yieldingly urging said vacuum valve member against said pressure valve.

10. The combination set forth in claim 9 wherein said spring comprises a compression spring interposed between the valve body and the valve member.

11. The combination set forth in claim 10 wherein said means frictionally interconnecting said lower valve body and said upper valve body provides an air tight seal.

* * * * *